United States Patent [19]
Roberts

[11] Patent Number: 5,932,646
[45] Date of Patent: *Aug. 3, 1999

[54] POLYMERIC COMPOSITION FOR WATERPROOFING WALLS

[75] Inventor: Michael G. Roberts, Akron, Ohio

[73] Assignee: R.P.C., Inc., Alpharetta, Ga.

[*] Notice: This patent is subject to a terminal disclaimer.

[21] Appl. No.: 08/959,909

[22] Filed: Oct. 29, 1997

[51] Int. Cl.⁶ .................................................. C08K 5/01
[52] U.S. Cl. ............................ 524/476; 524/499; 524/505
[58] Field of Search ................................. 524/474, 476, 524/490, 491, 499, 505

[56] References Cited

U.S. PATENT DOCUMENTS

| | | | |
|---|---|---|---|
| 4,049,853 | 9/1977 | Tortolo | 428/70 |
| 4,316,833 | 2/1982 | McGroarty | 524/447 |
| 4,325,854 | 4/1982 | Roberts et al. | 524/476 |
| 4,332,707 | 6/1982 | Roberts et al. | 524/476 |
| 4,370,435 | 1/1983 | Roberts et al. | 524/476 |
| 4,388,349 | 6/1983 | Korpman et al. | 427/208.4 |
| 4,471,094 | 9/1984 | Uffner et al. | 525/289 |
| 4,478,912 | 10/1984 | Uffner et al. | 428/349 |
| 4,530,652 | 7/1985 | Buck et al. | 428/291 |
| 4,537,921 | 8/1985 | Uffner et al. | 524/59 |
| 4,545,699 | 10/1985 | Uffner et al. | 404/31 |
| 4,861,635 | 8/1989 | Carpenter et al. | 428/41.03 |
| 4,882,384 | 11/1989 | Willis et al. | 525/105 |
| 4,897,276 | 1/1990 | Locke et al. | 426/307 |
| 4,921,775 | 5/1990 | Richter et al. | 430/281 |
| 4,939,036 | 7/1990 | Reith | 428/349 |
| 4,956,207 | 9/1990 | Kauffman et al. | 428/34.2 |
| 5,352,531 | 10/1994 | Roberts et al. | 428/446 |
| 5,534,303 | 7/1996 | Roberts et al. | 427/385.5 |
| 5,534,583 | 7/1996 | Roberts et al. | 524/476 |
| 5,804,635 | 9/1998 | Roberts | 524/476 |
| 5,807,638 | 9/1998 | Roberts | 428/451 |

OTHER PUBLICATIONS

Letter of protest by Michael G. Roberts protesting the allowance of U.S. Appln. No. 632,130 and attachments (U.S. 5,352,531).

*Primary Examiner*—D. S. Nakarani
*Attorney, Agent, or Firm*—Renner, Kenner, Greive, Bobak, Taylor, & Weber

[57] ABSTRACT

A composition of matter for waterproofing a surface of a wall comprising from about 30 to about 55 parts by weight of a polymeric base, said polymer base including from about 20 to about 45 parts by weight of a hydrocarbon resin, and from about 55 to about 80 parts by weight of a copolymer; and from about 45 to about 70 parts by weight of a solvent system, said solvent system including a blend of petroleum distillates and heptane.

18 Claims, 1 Drawing Sheet

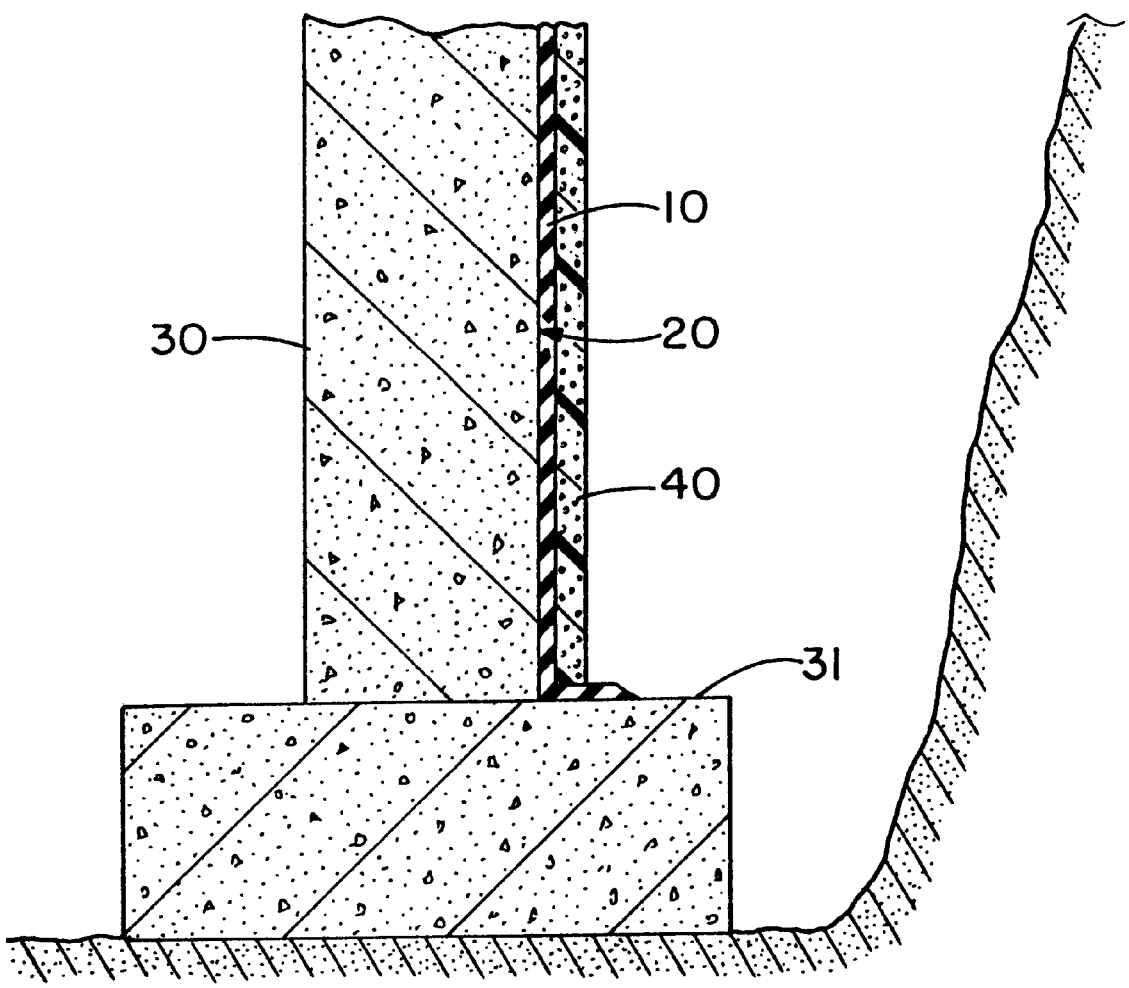

POLYMERIC COMPOSITION FOR WATERPROOFING WALLS

TECHNICAL FIELD

The present invention generally relates to a waterproofing composition and method of applying the same to a wall such as a basement wall. Particularly, the present invention relates to a waterproofing composition having an improved solvent system. Also provided is a basement wall having an exterior surface coated with an improved water impervious coating.

BACKGROUND ART

Waterproofing generally refers to a process whereby a composition is applied to a wall, such as a basement wall, to create a water impervious coating thereon. These compositions typically include asphalts dissolved in an organic solvent solution. Applying such compositions generally includes spraying the composition through a conventional air gun or the like and allowing the solvent to evaporate and form the water impervious coating. It is also common to apply a protective board over such coating, the board serving to protect the coating, and/or act as thermal insulation, and/or facilitate the drainage of water away from the walls. These boards typically include foamed polystyrene and fiberglass batts.

The water impervious coating should have good strength and elasticity, as well as demonstrate excellent water resistant characteristics. While these qualities have traditionally been achieved using asphalt based compositions, it has been found particularly useful to employ a polymer based composition, especially one comprising a blend of polymeric materials. This, however, requires compatibility of the polymeric materials so as to prevent separation of phases or ingredients, such separation typically resulting in the degradation of elasticity, toughness, and tack of the elastomeric coating. For purposes of this disclosure, the coatings resulting from polymeric compositions will be referred to as elastomeric coatings.

Employing a composition that is based on a combination of polymeric materials requires a proper physicochemical interaction between the polymer blend and the solvent system employed. Specifically, the solvent system must dissolve the various polymers, as well as impart numerous characteristics to the composition and coating as will be hereinafter recognized.

Of paramount importance, the solvent system must provide a sprayable solution. This typically includes the ability to provide a waterproofing composition having a viscosity less than about 5000 cps at temperatures greater than about 105° F. (40° C.), which is the temperature above which such compositions are commonly sprayed.

It is also very desirous that the solvent system impart a long shelf life to the waterproofing composition. Among the various commercial advantages of a long shelf life are the ability to store and transport the waterproofing compositions over longer periods of time. Shelf life, as will be referred to herein, represents the length of time required in which the waterproofing composition will separate or destabilize. In other words, shelf life represents the duration in which the solvent system can maintain proper physicochemical interaction with the polymer blend. A short shelf life is deleterious because a separated or destabilized composition is often rendered useless and must be reprocessed.

Also of paramount importance, the solvent must provide the ability to apply a uniform and consistent coating on the wall. In fact, architectural specifications require such consistency and uniformity in coating thickness on commercial and industrial walls, as well as some residential foundation walls. Generally, such specifications only allow a tolerance of +/−20% of the nominal thickness; that is, only a deviation of +/−20% of the desired thickness is permitted. It is believed that thickness uniformity is a function of the solvent system used, because the composition's ability to fill or web-out voids within the surface of the wall depends on the solvent used. Also, it is believed that the solvent employed dictates the consistency of the spray, which affects the thickness of the composition, thereby affects the thickness of the elastomeric coating. It is further believed that the solvent system employed affects the thickness uniformity because the solvent system dictates the drying rate of the composition, as well as the viscosity of the composition as the composition dries.

Not only does the solvent system affect the thickness uniformity of the elastomeric coating, but it is also believed to affect the ultimate quality of the elastomeric coating. For example, improper drying of the composition may cause the composition to skin over, resulting in blisters. Such blisters are believed to occur from the wet composition being too thick in a certain areas, typically resulting from the composition running and sagging on the wall prior to curing. These blisters cause inconsistency in the thickness of the coating and may ultimately provide a weak area where the elastomeric coating may rupture.

A solvent system for a polymer-based waterproofing composition is taught by Roberts et al. in U.S. Pat. No. 5,352,531. Roberts discloses a hydrocarbon resin and block copolymer dissolved in an organic solvent solution, the solvent containing a mixture of toluene and an aliphatic petroleum distillate. The distillate has a boiling range of about 190° F.–230° F., a flash point of about 18° F., a specific gravity of between about 0.709 to about 0.732 and an evaporation rate of about 2.2–2.6. The use of n-heptane or n-hexane is explicitly proscribed. This solution is sprayed to the exterior surface of a concrete foundation and the solvent is thereafter evaporated.

The sprayable composition of Roberts '531, however, exhibits several undesirable characteristics believed to result from the solvent system employed. Particularly, the composition does not spray or dry consistently, which is evidenced by unacceptable inconsistencies in the thickness of the wet composition upon the walls well as within the final coating. Also, the composition tends to run-down and sag, has a slow drying rate, poor shelf life, and creates inefficiencies including excessive material waste due to composition run-down prior to cure. Finally, it is believed that the resulting elastomeric coating of Roberts '531 is inferior due to the solvent system employed. This inferiority is generally evidenced by the appearance of the dried coating, as well as the frequency of the blisters that occur.

As generally discussed above, it is common to apply a protective board or film over the coating in order to protect the same. In some situations, however, the use of such protective boards or films is not desirable. This is due to the fact that the act of applying a board after to the application of the waterproofing composition greatly increases the total time and cost required to complete a waterproofing job or application. Moreover, most boards or films are generally impervious to volatile organic solvents. As a result, placement of such boards on an uncured wall greatly increases the dry or cure time of the coating. Furthermore, the placement of a board or film on an uncured coating can cause damage thereto. Heretofore in the art, however, such boards have been required to protect the coatings from potential damage that may be caused by gravel or backfill.

Thus a need exists to develop an improved solvent solution capable of dissolving a polymer based waterproofing composition for the purpose of spraying the composition onto a wall such as a basement wall. Furthermore, a need exists to develop an improved waterproofing composition that, when cured upon the exterior of a basement wall, will exhibit properties that obviate the requirement for the application of protective boards or films.

DISCLOSURE OF INVENTION

It is therefore a primary object of the present invention to provide a polymer-based waterproofing composition that is sprayable and exhibits improved shelf life.

It is a further object of the present invention to provide a polymer-based waterproofing composition that when applied to a wall will produce an improved elastomeric coating, the improvements relating to the thickness uniformity and quality of the coating.

It is still a further object of the present invention to provide a polymer-based waterproofing composition that upon curing has a tensile strength, puncture resistance and abrasion resistance sufficient to obviate the need for the application of a protective board or film.

It is another object of the present invention to provide a method of waterproofing a wall, the method employing an improved polymer-based waterproofing composition.

It is yet another object of the present to provide a waterproofed wall which is waterproofed with an improved continuous water impervious elastomeric coating disposed on the exterior surface of the wall.

In general the present invention provides a composition of matter for waterproofing a surface of a wall comprising from about 30 to about 55 parts by weight of a polymeric base, said polymer base including from about 20 to about 45 parts by weight of a hydrocarbon resin, and from about 55 to about 80 parts by weight of a copolymer; and from about 45 to about 70 parts by weight of a solvent system, said solvent system including a blend of petroleum distillates and heptane.

The present invention also provides a composition of matter for waterproofing a surface of a wall comprising from about 30 to about 55 parts by weight of a polymeric base, said polymer base including from about 20 to about 45 parts by weight of a hydrocarbon resin, and from about 55 to about 80 parts by weight of a solvent system, wherein the viscosity of the solution at about 70° F. in the range from about 30,000 cps to about 80,000 cps, and a viscosity of about 130° F. in the range from about 500 cps to about 1,500 cps.

The present invention also includes a wall that has been waterproofed with a waterproofing composition comprising from about 30 to about 55 parts by weight of a blended polymer base, said blended polymer base including from about 20 to about 45 percent by weight of a hydrocarbon resin, and from about 55 to about 80 percent by weight of a copolymer having units selected from the group consisting of styrene, isoprene, butadiene and mixtures thereof; and from about 45 to about 70 parts by weight of a solvent system, said solvent system including from about 50 to about 75 percent by weight a petroleum distillate, and from about 25 to about 50 percent by weight of heptane, said heptane including n-heptane.

At least one or more of the foregoing objects of the present invention together with the advantages thereof over existing waterproofing compositions, methods of waterproofing, and waterproofed basement walls, which shall become apparent from the specification that follows, are accomplished by the invention hereinafter described and claimed.

A preferred exemplary composition, method of applying the composition, and elastomeric coating, which incorporates the concepts of the present invention, is described by way of example in the accompanying preferred embodiment and experimental description, without attempting to show all the various forms and modifications in which the invention might be embodied, the invention being measured by the appended claims and not by the details of the specification.

BRIEF DESCRIPTION OF THE DRAWING

The FIGURE is a vertical, cross-sectional partial view of a wall having an elastomeric coating thereon.

BEST MODE FOR CARRYING OUT THE INVENTION

The present invention is generally directed toward a blended polymer-based waterproofing compositions. The waterproofing compositions are typically applied to at least one surface of a wall, preferably to the exterior of basement walls. The application is preferably accomplished by spraying the composition. This spraying generally occurs while the composition is heated, typically in the range between about 105° F. and about 160° F. (about 40° C. and about 71° C.), and preferably in the range between about 130° F. and about 140° F. (about 54° C. and about 60° C.). The composition is preferably sprayed using an airless spray device, such as a Graco 733 airless sprayer. Typically, an input pressure in the range between about 2500 and about 3500 psi (about 17,235 kPa and about 24,129 kPa) is employed.

The water proofing compositions of the present invention are generally characterized by a viscosity, at ambient temperatures, about 70° F. (about 21° C.), in the range from about 30,000 cps to about 80,000 cps. Preferably, the viscosity of the compositions, at about 70° F. (21° C.), is in the range between about 45,000 cps to about 75,000 cps. At about 130° F. (54° C.), the compositions are characterized by a viscosity in the range between about 500 cps to about 1,500 cps, and preferably by a viscosity in the range between about 800 cps to about 1,200 cps. Thus, it should be evident that the viscosity of the compositions are not consistent between ambient temperatures and the spraying range. Indeed, the viscosity rises sharply as the temperature of the solutions fall below the temperature necessary to spray the compositions.

Basement walls, as discussed herein, generally include any subsurface walls, typically including poured concrete or block walls. Desirably the application rate to poured concrete walls or parged concrete block walls will be approximately 20–30 square feet per gallon and for high density concrete block about 20–25 square feet per gallon. Once applied to the exterior wall of a basement, the compositions of the present invention are allowed to dry or cure which generally refers to the evaporation of the solvent system. Once dried, the compositions form a water-impervious, elastomeric coating upon the wall, as is best depicted in the FIGURE. A coating 10 is typically about 0.02 inch to about 0.08 inch (about 20 to about 80 mils), preferably about 0.03 inch to about 0.06 inch (about 30 to about 60 mils), and more preferably about 0.025 to about 0.04 inch (about 25 to about 40 mils) thick and typically covers the entire exterior surface 20 of the basement wall 30 from the foundation base 31 to the expected soil level. As mentioned above, a foam protection board 40 may be applied over the elastomeric coating, although the need for such a board or film is not required when certain embodiments of the present invention are employed, as will be described hereinafter.

The elastomeric coatings of the present invention have an improved uniform thickness, believed to result from the novel solvent system employed in applying the waterproofing compositions to a wall. Particularly, the elastomeric coatings of the present invention have a substantially uniform thickness. It is to be understood that a substantially uniform thickness refers to an elastomeric coating having a maximum variance from the nominal or desired thickness that is less than about +/−25%, and an average variance from the nominal thickness which is less than about +/−10%. In a preferred embodiment, the uniformity is narrower than substantially uniform in that the maximum variance from nominal thickness is less than about +/−20%, and the average variance from nominal thickness is less than about +/−5%.

In one embodiment of the present invention, the waterproofing compositions generally comprise a blended polymer base and a solvent system. The blended polymer base, also referred to as the solids content of the composition, generally accounts for between about 40 and about 60 parts by weight of the total weight of the composition, and the solvent system generally accounts for between about 60 and about 40 parts by weight of the total composition. Preferably, the solids content accounts for between about 45 and about 55 parts by weight of the total composition. Accordingly, the solvent system preferably accounts for between about 45 and about 55 parts by weight of the total weight of the composition.

The blended polymer base generally includes a hydrocarbon resin and a copolymer, preferably a block copolymer. The copolymers preferably include monomeric or polymeric units that include, but are not limited to, styrene, isoprene, butadiene, or mixtures thereof. Most preferably, the block copolymers include, but are not limited to, styrene-isoprene block copolymer, styrene-isoprene-styrene block copolymers, styrene-butadiene block copolymers, styrene-butadiene-styrene block copolymers, or mixtures thereof. Also preferred are hydrogenated block copolymers such as styrene-ethylene/butylene-styrene.

Typically, the blended polymer base includes between about 40 and about 60 percent by weight hydrocarbon resin, and preferably between about 45 and about 55 percent by weight hydrocarbon resin. Accordingly, the polymer base includes between about 60 and about 40 percent by weight block copolymers, and preferably between about 55 and about 45 percent by weight block copolymers.

The block copolymers employed are well-known in the art and are commercially available. Generally the molecular weight of these polymers is not critical but suitably will be in the range of about 60,000 to about 180,000. The styrene content and the butadiene or isoprene content are not critical but typically the styrene content will be between about 10 and about 35 percent by weight of the copolymer, and preferably between about 15 and about 30 percent by weight of the copolymer. Preferred materials are commercially available under the trademark KRATON and are supplied by the Shell Chemical Company. For example, KRATON D1107P Thermoplastic Rubber contains at least 98% styrene-isoprene-styrene block copolymer together with negligible amounts of talc, hydrated amorphous silica and antioxidant stabilizers. Further examples include KRATON G1652 and KRATON G1652M Thermoplastic Rubbers, which contain at least 98% styrene-ethylene/butylene-styrene block copolymers, and KRATON 1102 Thermoplastic Rubber, which is a styrene-butadiene-styrene bock copolymer.

The hydrocarbon resins that are employed are also commercially available. The hydrocarbon resin may be a polyterpene resin or a petroleum hydrocarbon resin. Polyterpene resins are typically formed by polymerizing $C_{10}H_{16}$ monomers, e.g. one or more of alpha-pinene, betapinene, limonene, dipentene, beta-phellandrene, myrcene, 3-carene, camphene and terpinolene. These resins are commonly sold as tackifiers.

The hydrocarbon resin can also be a petroleum resin, that is, a resin produced by the polymerization of cracked petroleum distillates. Such hydrocarbon resins can be formed by polymerizing aliphatic olefins and diolefins having four to six carbon atoms. Typically the olefins and diolefins consist primarily of monomers having five carbon atoms. Most desirably the hydrocarbon resin will be provided with some aromaticity. The aromaticity can be provided by polymerizing the monomers in the presence of styrene or an alpha-methyl styrene. Less suitably, the styrene and alpha-methyl styrene can be separately polymerized and blended in with the $C_4$–$C_6$ polymerized resin. These hydrocarbon resins are solid at room temperature. Exemplary formulations can be found in U.S. Pat. No. 3,577,398. Representative of the monomers which are typically included are isoamylene (2,2 dimethyl-1 propene), piperylene (1,3 pentadiene), isoprene (2-methyl-1,3 butadiene), 2-methyl-1 butene and 2 methyl-2 butene. Typically the hydrocarbon resins have softening points in excess of about 140° F. or 158° F. (60° or 70° C.) and usually in the range of about 140° F. (60° C.) to about 356° F. (180° C.). Most desirably they have softening points in the range from about 176° F. (80° C.) to about 230° F. (110° C.).

Commercially available hydrocarbon resins suitable for use in the present invention are those tackifiers supplied under the trade designation WINGTACK and specifically WINGTACK "PLUS" "115" "86" and "95". Others include the resins supplied commercially under the designation NEVTAC such as, for example, NEVTAC 100 and SUPER NEVTAC 99. It is, however, particularly preferred to employ the PICCOPALE 100 hydrocarbon resin which is available from Hercules Incorporated.

The waterproofing composition of the present invention further includes a solvent system. The solvent system includes a blend of petroleum distillates, preferably naphthenic distillates, and heptane. The solvent system includes from about 45 to about 70 percent by weight petroleum distillate and from about 30 to about 55 percent by weight heptane. Preferably, the solvent system includes from about 50 to about 65 percent by weight petroleum distillate and from about 35 to about 50 percent by weight heptane. The heptane employed must contain n-heptane, preferably in the range from about 20 to about 30 percent by weight of the total heptane. More preferably, the heptane will contain 25 percent n-heptane. Preferred among the naphthenic distillates is that sold under the name Lactol Spirits by UNOCAL. The preferred Lactol Spirits are generally characterized as set forth in TABLE I.

TABLE I

| TEST DESCRIPTION | TEST VALUE | ASTM TEST |
| --- | --- | --- |
| API Gravity (60/60 F) | 58.2 | D-287 |
| Distillation, IBP | 203° F. | D-86 |
| Distillation 10% | 205° F. | D-86 |
| Distillation 30% | 206° F. | D-86 |
| Distillation 50% | 207° F. | D-86 |
| Distillation 700 | 208° F. | D-86 |
| Distillation 90% | 212° F. | D-86 |
| Distillation DP | 220° F. | D-86 |
| Specific Gravity (60/60 F) | 0.745 | D-1298 |
| Kauri-Butanol Value (XB) | 41.1 | D-1133 |
| Aniline Point | 113.2° F. | D-611 |
| Flash Point (TCC) | 17° F. | D-96 |
| Color, Saybolt | 30 | D-156 |
| Doctor Test | −1.000 | D-235 |
| Corrosion (3 hrs @ 122° F.) | 1.000 | D-130 |
| Aromatic Content | 11.75% (volume) | GC |
| Benzene Content | 0.010% (weight) | D-2600 |
| Toluene | 11.74% (volume) | GC |
| CB Aromatics | 0.001% | GC |
| Water Content | 72 ppm | D-1364 |

Further, naphthenic processing oils may be added to the solvent system. These materials are commercially available, for example, from the Shell Chemical Company under the tradename SHELLFLEX 371, which is a heavy naphthenic distillate solvent that has been refined, hydrotreated, and acid treated. Also available is that sold by Crowley Chemical Company under the trademark VIPLEX, which is a light naphthenic hydrotreated distillate. When employed, the processing oil may be present in an amount up to about 7 percent by weight, based on the amount of block copolymer and hydrocarbon resin employed.

The elastomeric coatings of the present invention have an elongation (ASTM D412 Die C) of over 1800%. The coatings are flexible to minus 20° F. (tested by bending around a inch mandrel) and the abrasion resistance is less than about 0.1% membrane loss (measured using 700 psi on a 061,×0.0611 point moving across a coating membrane at the rate of about 1 inch per second). The crack bridging ability (ASTM 836) exceeds ten cycles to ⅛ inch at minus 15° F. The water vapor permeance as measured by ASTM E96 (water method) is about 0.21 perms for 40 mil dry coating grams per square foot per hour in Hg. The coatings also show excellent resistance to bacterial attack, to degradation in soil, to algae and fungus. Based on visual inspection the coatings have excellent resistance to chemicals typically found in soils and have good solvent resistance compared to asphaltic based products.

In another embodiment, the waterproofing compositions likewise comprise a blended polymer base and a solvent system. In this embodiment, however, the blended polymer base generally accounts for between about 30 and about 55 parts by weight of the total weight of the composition, and the solvent system generally accounts for between about 45 and about 70 parts by weight of the total composition. Preferably, the solids content accounts for between about 35 and about 50 parts by weight of the total composition, and the solvent system preferably accounts for between about 50 and about 65 parts by weight of the total weight of the composition.

The blended polymer base likewise includes a hydrocarbon resin and a copolymer. The copolymer is preferably a styrene-butadiene-styrene block copolymer. As noted above, such styrene-butadiene-styrene copolymers are available from the Shell Chemical Company under the trademark KRATON 1102 thermoplastic rubber.

The blended polymer base includes between about 20 and about 45 parts by weight hydrocarbon resin and between about 55 and about 80 parts by weight block copolymer based on the total weight of the polymer base. Preferably, the blended polymer base includes between about 25 and about 40 parts by weight hydrocarbon resin, and preferably between about 60 and about 75 parts by weight block copolymer based on the total weight of the polymer base.

Those hydrocarbon resins noted hereinabove are useful in this embodiment, but it should be understood that there is no need to select a hydrocarbon resin that will provide tack to the coating. Accordingly, any hydrocarbon resin that will provide adhesion to the substrate will be useful in this embodiment. For example, in addition to those hydrocarbons noted hereinabove, the hydrocarbon resin sold under the tradename POLY-PET 100 by the Crowley Chemical Company is also useful.

The solvent system useful in this embodiment of the present invention includes a blend of petroleum distillates, preferably naphthenic distillates, and heptane. The solvent system includes from about 50 to about 75 percent by weight petroleum distillate and from about 25 to about 50 percent by weight heptane. Preferably, the solvent system includes from about 55 to about 65 percent by weight petroleum distillate and from about 35 to about 45 heptane. The heptane employed must contain n-heptane, preferably in the range from about 20 to about 30 percent by weight of the total heptane. More preferably, the heptane will contain about 25 percent by weight n-heptane.

The elastomeric coating resulting from the waterproofing composition of this embodiment of the present invention unexpectedly exhibits unique properties that eliminate the need for protective boards or films. Namely, the coating composition exhibits extremely high tensile strength, puncture resistance, and abrasion resistance. Additionally, the coating composition of this embodiment exhibits those properties characteristic of the previously discussed elastomeric coatings of the present invention.

Specifically, the elastomeric coatings of this embodiment have an elongation (ASTM D412 Die C) of over 1000%. The coatings are flexible to minus 30° F. (tested by bending around a inch mandrel) and the abrasion resistance is less than about 0.1% membrane loss (measured using 700 psi on a 061,×0.0611 point moving across a coating membrane at the rate of about 1 inch per second). The crack bridging ability (ASTM 836) exceeds ten cycles to ⅛ inch at minus 15° F. The water vapor permeance as measured by ASTM E96 (water method) is about 0.21 perms for 40 mil dry coating grams per square foot per hour in Hg. The coatings also show excellent resistance to bacterial attack, to degradation in soil, to algae and fungus. Based on visual inspection the coatings have excellent resistance to chemicals typically found in soils and have good solvent resistance compared to asphaltic based products. Furthermore, the coatings according to this embodiment pass the strictest of impact or indentation tests as specified by the Canadian General Standards Board (Dynamic Impact Test CGSB 37-CP-52M, Section 7.2.10). Moreover, the coatings of this embodiment exhibit a tensile strength of over 600 psi.

EXPERIMENTAL

EXAMPLE I

In order to demonstrate the practice of the present invention, six (6) waterproofing compositions were prepared, three (3) according to the specifications of the present invention, and three (3) according to the prior art, namely Roberts '531. Each composition was applied to a separate and distinct commercial foundation, referred to as Buildings A–F. Three (3) wet film measurements were taken on each of four (4) walls of each building. The recipes of the six (6) compositions are shown in TABLE II, and the results of the wet film measurements are shown in TABLE III.

The compositions sprayed on Buildings A, B, and C represent those coatings taught by the prior art, and the compositions sprayed on Buildings D, E, and F represent compositions according the present invention.

TABLE II

Waterproofing Composition Constituent Concentration (Percent by weight)

| Constituent | BUILDING | | | | | |
|---|---|---|---|---|---|---|
| | A | B | C | D | E | F |
| Kraton D 1107 P | 22 | 23.5 | 22 | 22 | 23.5 | 22 |
| Piccopale 100 | 25 | 23.5 | 25 | 25 | 23.5 | 25 |
| Pigment (green) | 1 | 1 | 1 | 1 | 1 | 1 |
| Lacolene | 43 | 43 | 41 | — | — | — |
| Toluene | 7 | 7 | 9 | — | — | — |
| Lactol | — | — | — | 20 | 20 | 23.5 |
| Heptane | — | — | — | 30 | 30 | 27.5 |
| Shellflex 371 | 2 | 2 | 2 | 2 | 2 | 2 |

Each wall was sprayed using an airless sprayer equipped with a 731 spray tip. All compositions were sprayed at 140° F. (60° C.) with 3000 psi (20,682 kPa) of input pressure. The environmental conditions were also consistent for each application, generally sunny, low wind, with temperatures in the range between 65° F. and 75° F. (18° C.–24° C.).

Film thicknesses, that is, the thickness of the wet composition upon the wall, were measured using a wet thickness gauge, which gives readings in two thousandths of an inch (2 mils). It should be appreciated that the solids content of the composition of the present invention, as well as that of the prior art., is approximately 45–55%, and therefore, the thickness of the elastomeric coating resulting therefrom is approximately one half (½) that of the wet composition upon the wall. The three film thickness readings taken from each wall were taken within a four (4) ft. by four (4) ft. area. The specification of each building called for a wet thickness of 60 mils, and therefore the percent (%) variance was calculated based on deviance from 60 mils.

Regarding the wet thickness readings resulting from the composition of the prior art used on Buildings A, B, and C, the maximum variance for each building was 27%, 47%, and 37%, respectively; and the average variance for each building was 13%, 17%, and 17%, respectively. With regard to the wet thickness readings resulting from the composition of the present invention used on Buildings D, E. and F, the maximum variance for each building was 17%, 17%, and 20%, respectively; and the average variance for each building was 7%, 6%, and 5%, respectively. Thus, the average variance for the composition of the prior art was 15%, while the average variance for the present invention was 6%.

As should be clearly evident, the improved solvent system of the present invention provided for a wet thickness, and therefore an elastomeric coating, that has improved uniformity of thickness. Indeed, all readings were within +/−20% variance of 60 mils, while ten (10) readings using the solvent system of the prior art were outside of the +/−20% variance. Moreover, the average variance of the present invention is only 40% as great as that of the prior art.

Additionally, the waterproofing composition of the present invention and that of the prior art, Roberts '531, were subjected to a stability test. The compositions were substantially identical to those described in TABLE II; that is, the compositions representing the present invention were substantially identical to the compositions applied to Buildings D, E, and F, and the compositions representing the prior art were substantially identical to the compositions applied to Buildings A, B, and C.

The stability test was performed as follows. Four (4) samples of each composition, that of the present invention and the prior art, were placed in sealed pint cans. These cans were placed in an oven and maintained at a constant temperature of 95° F. (35° C.) for a period of thirty (30) days. The cans were removed from the oven and cooled to ambient temperature. The lids were then removed without disturbing the contents. The depth of the colorless liquid on the top of each sample was measured and is reported in TABLE IV.

TABLE III

Wet Film Thickness
Specification of 60 Wet Mils

| WALL | Reading | Building A | | Building B | | Building C | | Building D | | Building E | | Building F | |
|---|---|---|---|---|---|---|---|---|---|---|---|---|---|
| | | Mils | % Var | Mils | % Var | Mils | % Var | Mils | % Var | Mils | % Var | Mils | % Var |
| I | 1 | 76 | 27 | 52 | 13 | 76 | 27 | 62 | 3 | 62 | 3 | 60 | 0 |
| | 2 | 62 | 3 | 72 | 20 | 46 | 23 | 66 | 10 | 64 | 7 | 48 | 20 |
| | 3 | 72 | 20 | 72 | 20 | 62 | 3 | 58 | 3 | 66 | 10 | 62 | 3 |
| II | 1 | 62 | 3 | 32 | 47 | 70 | 17 | 70 | 17 | 56 | 7 | 60 | 0 |
| | 2 | 56 | 7 | 48 | 20 | 68 | 13 | 58 | 3 | 60 | 0 | 58 | 3 |
| | 3 | 74 | 23 | 62 | 3 | 82 | 37 | 66 | 10 | 66 | 10 | 64 | 7 |
| III | 1 | 50 | 17 | 66 | 10 | 68 | 13 | 64 | 7 | 70 | 17 | 62 | 3 |
| | 2 | 48 | 20 | 64 | 7 | 58 | 3 | 64 | 7 | 66 | 10 | 68 | 13 |
| | 3 | 68 | 13 | 58 | 13 | 52 | 13 | 60 | 0 | 62 | 3 | 60 | 0 |
| IV | 1 | 60 | 0 | 72 | 20 | 56 | 7 | 54 | 10 | 58 | 3 | 64 | 7 |
| | 2 | 58 | 3 | 62 | 3 | 36 | 40 | 58 | 3 | 56 | 7 | 56 | 7 |
| | 3 | 74 | 23 | 80 | 33 | 38 | 37 | 66 | 10 | 60 | 0 | 60 | 0 |

TABLE IV

Accelerated Stability Test
Separation (mm)

| | SAMPLE NO. | | | |
|---|---|---|---|---|
| | 1 | 2 | 3 | 4 |
| Prior Art | 30 | 17 | 43 | 12 |
| Present Invention | <1* | <1* | <1* | <1* |

*separation was negligible an not measurable

The depth of the colorless liquid, which is believed to primarily comprise the solvent system, is directly related to the degree of separation or destabilization of the composition. In turn, the degree of separation or destabilization is directly related to the shelf life of the product. The shelf life of polymeric based compositions is critical because separation can often only be cured by the reprocessing of the composition.

The above results clearly demonstrate that the composition of the present invention has far greater stability than the composition of the prior art. Thus, the composition of the present invention is expected to have a shelf life far greater than that of the prior art. It is believed that the separation observed with the compositions of the prior art is responsible for the unacceptable shelf life often experienced with that composition.

Further, it should be noted that the composition of the present invention demonstrates many other improved characteristics not quantified herein. For example, the composition exhibits an improved dry rate, believed to result from the unexpected and surprisingly high viscosity of the solution at ambient temperatures. Also, the composition of the present invention demonstrates decreased sag and run-down, which minimizes blistering and material waste, the material waste resulting from the composition running down the wall prior to curing. Moreover, the elastomeric coating of the present invention provides an excellent appearance, as well an excellent seal resulting from the reduced sag, run-down and blistering of the composition.

EXAMPLE II

In order to demonstrate other embodiments of the present invention, six waterproofing compositions were prepared. The recipes for these compositions are shown in Table V, hereinbelow.

TABLE V

Waterproofing Composition Constituent Concentration (Percent by weight)

| | BUILDING | | | | | |
|---|---|---|---|---|---|---|
| Constituent | A | B | C | D | E | F |
| Kraton D 1102 P | 23.0 | 25.2 | 28.0 | 26.0 | 26.0 | 28.0 |
| Piccopale 100 | 12.2 | 16.8 | 12.0 | 13.0 | 13.0 | 12.0 |
| Pigment (green) | 1 | 1 | 1 | 1 | 1 | 1 |
| Lacolene | — | 49 | 49 | 49 | — | — |
| Toluene | — | 8 | 8 | 9 | — | — |
| Lactol | 38.4 | — | — | — | 36.0 | 35.4 |
| Heptane | 25.6 | — | — | — | 24.0 | 23.6 |
| Shellflex 371 | — | — | 2 | 2 | — | — |

Each composition was sprayed onto a substrate, air dried, and tested for drying time and relative dimensional shrinkage. Each dried coating was also subjected to a modified puncture test. According to this test, each of the membranes were placed on a metal plate. A metal rod, measuring 5/16" in diameter, was then place axially onto the coating on the opposite side of the metal plate. A one kilogram weight was then allowed to contact the top of the metal rod with a force resulting from having fallen one foot above the rod. Those coatings that were punctured by this test, i.e., the rod was able to penetrate to the metal plate, failed the test.

Specifically, Recipes A, E, and F passed the modified puncture test in that the metal rod did not penetrate to the metal plate. Accordingly, these recipes and resulting coatings were identified as likely candidates for use as a waterproofing composition that would form a useful coating. More specifically, the coatings formed from compositions A, E, and F exhibit physical characteristics that obviate the need for a protective board or film. These characteristics were likewise confirmed in field testing based on observations made when basement walls having these improved coatings were backfilled.

The many benefits of the present invention as described above can also be obtained by including other ingredients in the formulation provided, of course, that those ingredients, either qualitatively or quantitatively, do not materially change the basic and novel characteristics of the present inventive formulations. Such adjuvants, although not needed for coating basement walls, may include stabilizers, antioxidants and pigments or colorants in amounts suitable to achieve their purpose.

Based upon the foregoing disclosure, it should now be apparent that the composition, method of applying the composition, and article resulting from the application of the composition as described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A composition of matter for waterproofing a surface of a wall comprising:
   from about 30 to about 55 parts by weight of a polymeric base, said polymer base including
      from about 20 to about 45 parts by weight of a hydrocarbon resin, and
      from about 55 to about 80 parts by weight of an elastomeric copolymer having units selected from the group including styrene, isoprene, butadiene, ethylene, butylene and mixtures thereof wherein said hydrocarbon resin and said elastomeric copolymer total about 100 parts by weight; and
   from about 45 to about 70 parts by weight of a solvent system, wherein said solvent system includes a blend of petroleum distillates and heptane, wherein said heptane comprises n-heptane, and wherein said polymer base and said solvent system total about 100 parts by weight.

2. A compositions of matter, as set forth in claim 1, wherein said solvent system includes from about 50 to about 75 parts by weight of said petroleum distillate, and from about 25 to about 50 parts by weight of said heptane, based on the total weight of said solvent system.

3. A composition of matter, as set forth in claim 1, wherein said heptane includes n-heptane in an amount from about 20 to about 30 parts by weight, based on the total weight of heptane.

4. A composition of matter, as set forth in claim 1, wherein said copolymer is a styrene-butadiene-styrene block copolymer.

5. A composition of matter, as set forth in claim 4, wherein said hydrocarbon resin is a petroleum resin.

6. A composition of matter, as set forth in claim 1, wherein said petroleum distillate comprise naphthenic distillates.

7. A composition of matter, as set forth in claim 1, wherein said copolymer is a styrene-isoprene-styrene block copolymer.

8. A composition of matter, as set forth in claim 1, wherein said copolymer includes a blend of a styrene-butadiene-styrene copolymer and styrene-isoprene-styrene copolymer.

9. A composition of matter, as set forth in claim 1, further comprising a processing oil.

10. A composition of matter for waterproofing a surface of a wall comprising:
   from about 30 to about 55 parts by weight of a polymeric base, said polymer base including
      from about 20 to about 45 parts by weight of a hydrocarbon resin, and
      from about 55 to about 80 parts by weight of an elastomeric copolymer having units selected from the group including styrene, isoprene, butadiene, ethylene, butylene and mixtures thereof; and
   from about 45 to about 70 parts by weight of a solvent system, wherein the viscosity of the composition at about 70° F. is in the range from about 30,000 cps to about 80,000 cps, and at about 130° F. is in the range from about 500 cps to about 1,500 cps.

11. A composition of matter, as set forth in claim 10, wherein said solvent system includes heptane, said heptane including n-heptane.

12. A composition of matter, as set forth in claim 11, wherein said solvent system includes from about 25 to about 50 parts by weight of said heptane and from about 50 to about 75 parts by weight of a petroleum distillate, based on the total weight of said solvent system.

13. A composition of matter, as set forth in claim 12, wherein said petroleum distillates comprise naphthenic distillates.

14. A composition of matter, as set forth in claim 10, wherein said copolymer is a styrene-butadiene-styrene block copolymer.

15. A composition of matter, as set forth in claim 14, wherein said hydrocarbon resin is a petroleum resin.

16. A composition of matter, as set forth in claim 10, wherein said copolymer is a styrene-isoprene-styrene block copolymer.

17. A composition of matter, as set forth in claim 10, wherein said copolymer includes a blend of a styrene-butadiene-styrene copolymer and styrene-isoprene-styrene copolymer.

18. A composition of matter, as set forth in claim 10, further comprising a processing oil.

* * * * *